US008184548B1

(12) United States Patent
Croak et al.

(10) Patent No.: US 8,184,548 B1
(45) Date of Patent: May 22, 2012

(54) METHOD AND APPARATUS FOR PROVIDING A SINGLE BILL FOR TRANSACTIONS INVOLVING MULTIPLE APPLICATIONS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1169 days.

(21) Appl. No.: 11/258,328

(22) Filed: Oct. 24, 2005

(51) Int. Cl.
*H04L 00/10* (2006.01)
(52) U.S. Cl. ........ 370/252; 370/241; 370/352; 370/401; 370/253; 705/412; 705/26; 705/27.1
(58) Field of Classification Search .................. 370/252, 370/241, 253, 352, 392, 248, 401; 705/412; 340/870.02
See application file for complete search history.

(56) References Cited

U.S. PATENT DOCUMENTS

| 7,529,259 B2 * | 5/2009 | Van Acker et al. ........... 370/412 |
| 2001/0027449 A1 * | 10/2001 | Wright .......................... 705/412 |
| 2004/0243524 A1 * | 12/2004 | Crichlow ...................... 705/412 |
| 2005/0147035 A1 * | 7/2005 | Sylvain et al. ................ 370/230 |
| 2006/0215636 A1 * | 9/2006 | Corley et al. ................. 370/352 |

* cited by examiner

*Primary Examiner* — Kwang B Yao
*Assistant Examiner* — Jamal Javaid

(57) ABSTRACT

A method and apparatus for integrating billing of usage of multiple applications onto a single bill are disclosed. For example, in a single day, a user may download musical selections, watch on demand video sessions, and make numerous phone calls. All the sessions can be activated over a single video endpoint device and through a single network service. Records of these sessions can be generated and aggregated to produce a single billing statement that can be accessed on a near real time basis by the user and paid automatically or at a scheduled time.

20 Claims, 5 Drawing Sheets

200

METHOD AND APPARATUS FOR PROVIDING A SINGLE BILL FOR TRANSACTIONS INVOLVING MULTIPLE APPLICATIONS

The present invention relates generally to communication networks and, more particularly, to a method and apparatus for providing a single bill for transactions involving multiple applications in communication networks, e.g., packet networks such as Service over Internet Protocol (SoIP) networks.

BACKGROUND OF THE INVENTION

As extremely high bandwidth access networks become more accessible to residential subscribers, they enable service providers of these networks to integrate voice, video, and data, thereby providing more convenience for end customers and creating new service opportunities. Due to the multi-service nature of these new services, networks need to provide additional functionalities to end customers to support integrated control of these different types of services. For instance, a user can establish multiple application sessions to download music, to watch an on demand movie, and to make phone calls to other called parties. Each of these application sessions may have different rate structure. For example, music download may be charged on a per download basis, on demand movie may be charged on a pay per view basis, and phone calls may be charged on a flat monthly rate basis.

Therefore, a need exists for a method and apparatus for providing a single bill for transactions involving multiple applications in a packet network, e.g., a SoIP network.

SUMMARY OF THE INVENTION

In one embodiment, the present invention enables a method for integrating billing of usage of multiple applications onto a single bill. For example, in a single day, a user may download musical selections, watch on demand video sessions, and make numerous phone calls. All the sessions can be activated over a single video endpoint device and through a single network service. Records of these sessions can be generated and aggregated to produce a single billing statement that can be accessed on a near real time basis by the user and paid automatically or at a scheduled time.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
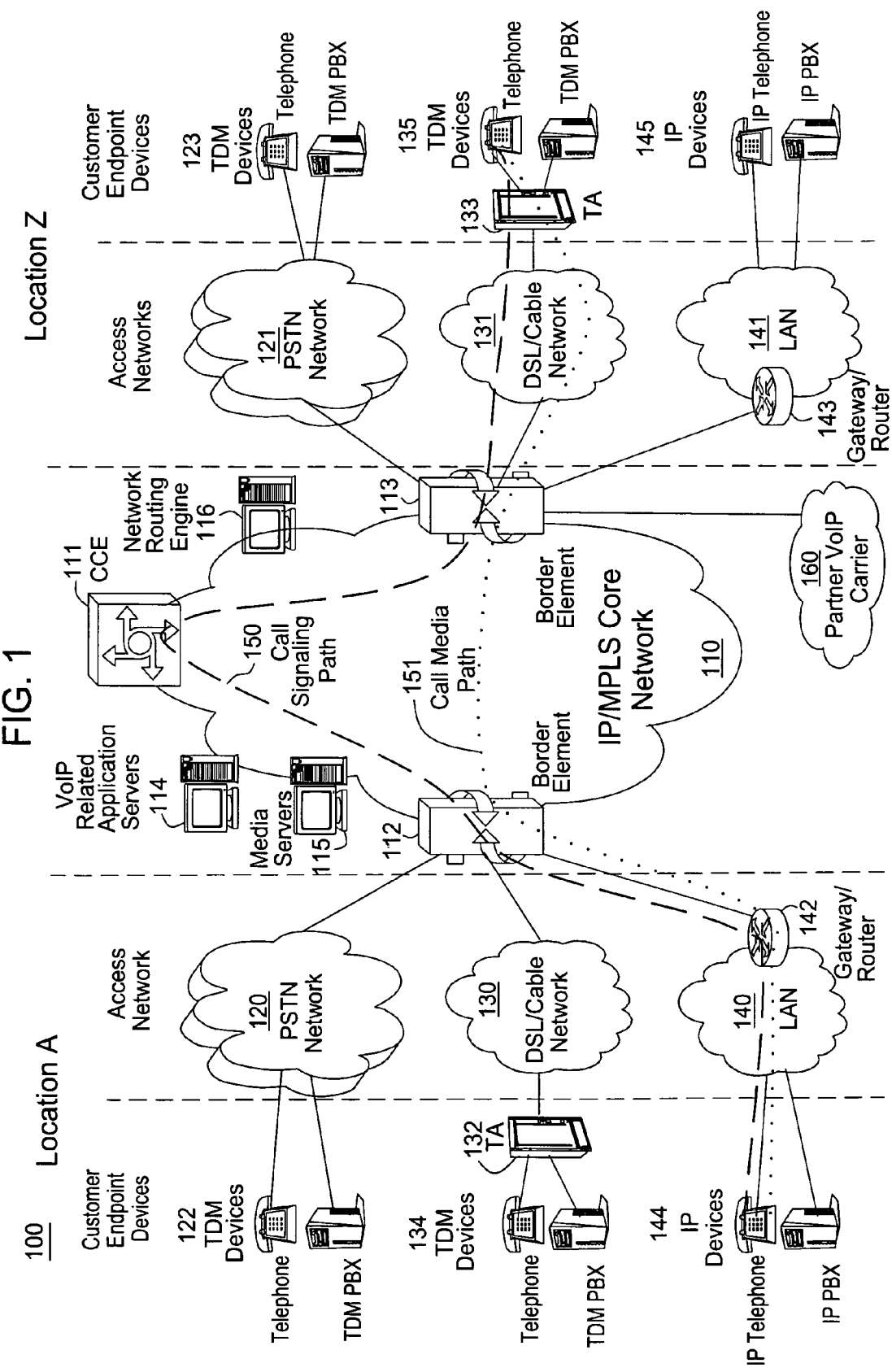
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
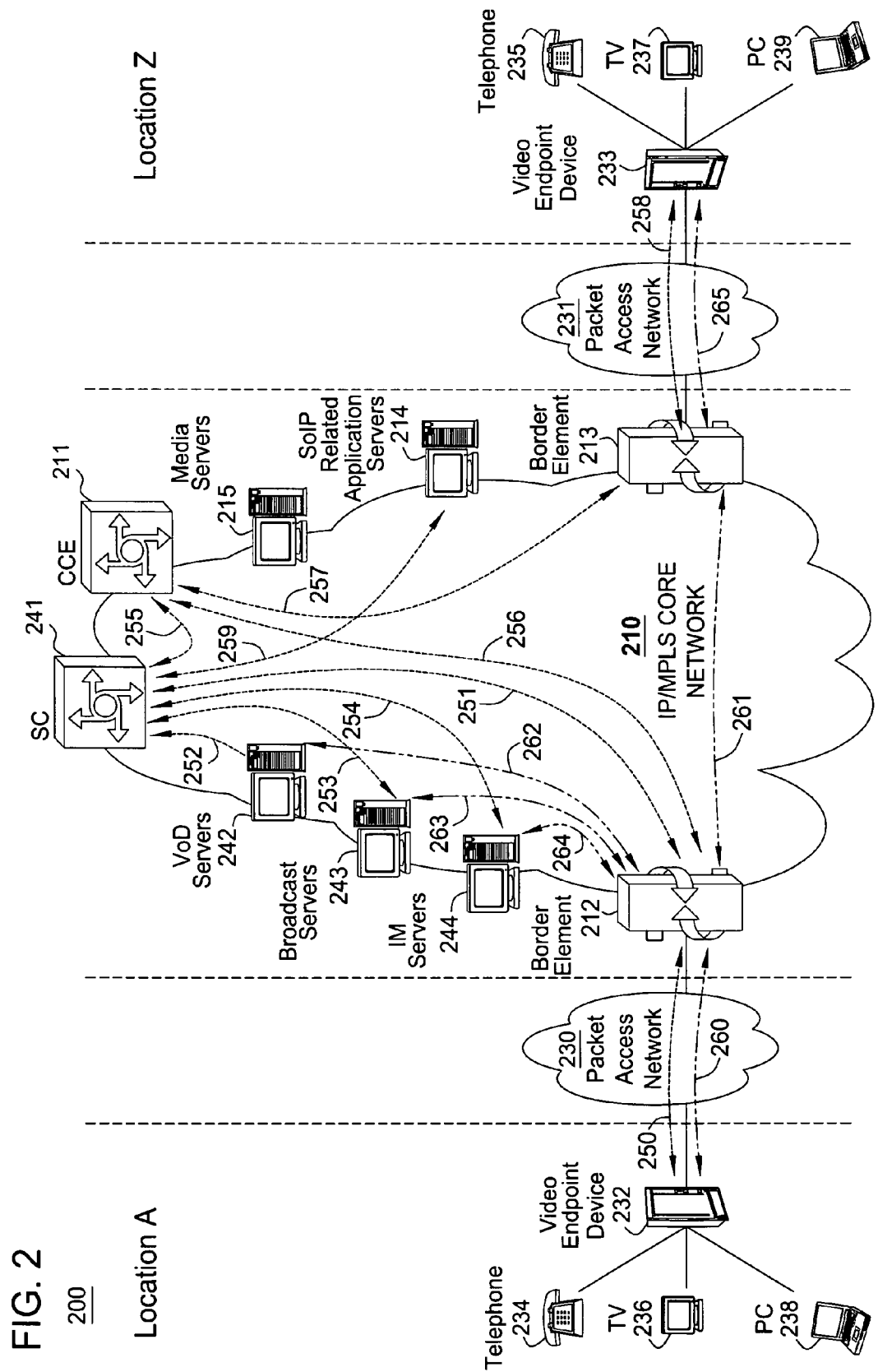
FIG. 2 illustrates an exemplary Service over Internet Protocol (SoIP) network related to the present invention.

The network shown in FIG. 1 can be extended to become a SoIP network that supports multi-service applications including, but not limited to, video services. FIG. 2 illustrates a communication architecture 200 having an example network, e.g., a packet network such as a SoIP network related to the present invention. A SoIP network supports multi-service applications including voice, data, and video services. In one embodiment, a SoIP network that supports video services is described below. In this SoIP network, voice services supported include, but are not limited to, VoIP services; data services supported include, but are not limited to, Instant Messaging (IM), electronic mail (email), internet access services, or any other IP based applications; and video services include, but are not limited to, Video on Demand (VoD), broadcast video, and video conferencing services.

A SoIP network that supports video services comprises an intelligent multi-service endpoint device connected via packet access networks to a service provider's SoIP core infrastructure employing Internet Protocol (IP) and/or Multi-Protocol Label Switching (MPLS) Protocols. Broadly defined, a SoIP network is a network that is capable of carrying voice, video, and data signals as packetized data over an IP network. The present invention is described below in the context of an illustrative SoIP network that supports video services. Thus, the present invention should not be interpreted to be limited by this particular illustrative architecture.

Video endpoint device 232 and 233 are IP based intelligent multi-service endpoint device supporting voice, video, and data applications. Video endpoint device 232 and 233 are signaling endpoints of application sessions, e.g. a VoIP session endpoint, an instant messaging endpoint, or a video session endpoint. In one embodiment, a video endpoint device is a standalone device that can be connected to home electronic appliances such as, but is not limited to, telephone 234 and 235, TV 236 and 237, or Personal Computer (PC) 238 and 239. In another embodiment, a video endpoint device can be integrated with a TV, a PC, or any home appliances with a display.

The access networks are packet based. Packet based access networks 230 and 231 use, but are not limited to, Frame Relay, ATM, Ethernet, IP, DSL or Cable broadband access network technologies to interconnect a video endpoint device to a SoIP network that supports video services.

The core SoIP infrastructure that supports video services comprises of several key components, such the Border Element (BE) 212 and 213, the Call Control Element (CCE 211, SoIP related Application Servers (AS) 214, Media Servers (MS) 215, Session Controller (SC) 241, Video of Demand (VoD) Servers 242, Broadcast Servers (242), and Instant Messaging (IM) Servers 243. A BE resides at the edge of the SoIP core infrastructure and interfaces with customers endpoints over various types of access networks. The functions supported by a BE include those supported by a BE as previously described in network 100 and FIG. 1. In addition, in a SoIP network that supports video services, a BE also serves as a gateway between a video endpoint device used by a subscriber and the SoIP core network that supports video services. All application sessions initiated by a SoIP subscriber must gain entry to the SoIP core network via a BE. The functions supported by a CCE and a MS are the same as those previously described in network 100 and FIG. 1. A Session Controller (SC) resides within the SoIP infrastructure and is connected to the BEs using an IP based signaling protocol such as, but is not limited to, Session Initiation Protocol (SIP).

A SC is responsible for setting up all application session requests, such as VoIP call requests, video session requests, or data session requests, originated by a customer within the network and interacts with, if necessary, the appropriate SoIP related AS in order to complete an application session that requires certain service specific features originated by a customer. A SC also keeps track of all sessions initiated by a customer for session management and billing purposes as well. The functions supported by a SoIP related AS include those supported by a VoIP AS as previously described in network 100 and FIG. 1. In addition, a SoIP AS also supports all video specific application features. A VoD Server is responsible for supporting video on demand video session requests originated by a customer and sends the requested streaming video contents, such as a movie, to the customer. A Broadcast Server is responsible for supporting broadcast video session requested originated by a customer and sends streaming broadcast video contents, such as TV channels, to the customer. The VoD Server and the Broadcast Server sends streaming video contents to video endpoint devices using compression technologies including, but are not limited to, Moving Picture Experts Group (MPEG) 2, MPEG 4, MPEG 7, MPEG 21. An IM Server is responsible for supporting IM applications involving multiple users. Instant Messaging is a form of electronic communication that involves immediate typed text correspondence between two or more users over the Internet who are online simultaneously. IM is a text-based computer conference over the Internet between two or more people who are online at the same time.

In order to illustrate how the different components in a SoIP network operate to support video services, the following scenarios are used to illustrate how voice, data, and video sessions are setup between the SoIP network and a video endpoint. In one embodiment, a customer using video endpoint device 232 at location A places a VoD session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoD session; therefore, the request will be forwarded to VoD Server 242 using signaling path segment 252. SC 241 may interact with AS 214 using signaling path segment 259 to verify customer's subscription information or to retrieve video specific applications or data in order to complete the session request. Once the VoD session is verified, VoD Server 242 sends the requested VoD streaming contents to BE 212 using data path segment 262. BE 212 then forwards the requested VoD streaming contents to video endpoint 232 using data path segment 260. Similarly, a customer at location Z using TV 237 connected to video endpoint 233 can request a VoD session via SC 241 with streaming VoD contents sent by VoD Server 242. Note that a VoD server may be placed closer to end users in a packet access network to serve video endpoints in an alternative embodiment.

In another embodiment, a customer using video endpoint device 232 at location A places a broadcast video session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a broadcast video session for a particular premium TV channel; therefore, the request will be forwarded to Broadcast Server 243 using signaling path segment 253. SC 241 may interact with AS 214 using signaling path segment 259 to verify customer's subscription information or to retrieve video specific applications or data in order to complete the session request. Once the broadcast session is verified, Broadcast Server 243 sends the requested broadcast video streaming contents to BE 212 using data path segment 263. BE 212 then forwards the requested broadcast video streaming contents to video endpoint 232 using data path segment 260. Similarly, a customer at location Z using TV 237 connected to video endpoint 233 can request a broadcast video session via SC 241 with streaming broadcast video contents sent by Broadcast Server 243. Note that a Broadcast server may be placed closer to end users in a packet access network to serve video endpoints in an alternative embodiment.

In another embodiment, a customer using video endpoint device 232 at location A places an IM session request to the video network using PC 238. During the session initiation, a setup signaling message is sent from video endpoint device 232 to BE 212 using signaling path segment 250. BE 212 will then send a setup signaling message, including login and password information of the user, to SC 241 using signaling path segment 251. SC 241 processes the session requests and forwards the request to the appropriate server for further processing. In this case, the request to sign on an IM session; therefore, the request will be forwarded to IM Server 244 using signaling path segment 254. SC 241 may interact with AS 214 using signaling path segment 259 to verify customer's subscription information or to retrieve IM specific applications or data in order to complete the session request. Once the IM session is verified, IM Server 244 establishes the requested IM data path to video endpoint 232 via BE 212 using data path comprising data path segment 260 and 264. Similarly, a customer at location A using TV 236 connected to video endpoint 232 or a customer at location Z using PC 239 or TV 237 connected to video endpoint 233 can request an IM session via SC 241 with IM functions provided by IM Server 244.

In another embodiment, a customer using video endpoint device 232 at location A places a VoIP session request destined to video endpoint device 233 via the SoIP network that supports video services using telephone 234. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoIP session for a call destined to a called party at location Z; therefore, the request will be forwarded to CCE 211 using signaling path segment 255. CCE may interact with AS 214 using signaling path segment 259 to verify customer's subscription information or to retrieve VoIP specific applications or data in order to complete the session request. The signaling flows to establish a VoIP call between video endpoint device 232 and 233 is similar to those described previously in network 100 and FIG. 1. In one embodiment, the Application Server (AS) functions as a SIP back-to-back user agent. Since BE 213 needs to be involved in completing the call; CCE 211 sends another call setup message, such as a SIP-INVITE message if SIP is used, to BE 213 using signaling path segment 257. Upon receiving the call setup message, BE 213 forwards the call setup message, via packet access network 231 to video endpoint device 233 using signaling path segment 258. Video endpoint device 233 then identifies telephone 235 and rings that telephone. Once the call is accepted at location Z by the called party, a call acknowledgement signaling message, such as a SIP 200 OK response message if SIP is used, is sent in the reverse direction back to the CCE 211. After the CCE 211 receives the call acknowledgement message, it will then send a call acknowledgement signaling message, such as a SIP 200 OK response message if SIP is used, toward the calling party at location A using signaling path comprising signaling path segment 256 and 250 via BE 212. In addition, the CCE 211 also provides the necessary information of the call to both BE 212 and BE 213 so that the call data exchange can proceed directly between BE 212 and BE 213. CCE 211 also provides the call completion status of a VoIP call to SC 241. The call media path comprising media path segment 260, 261, and 265 are illustratively shown in FIG. 2. Note that the call signaling path and the call media path are different because once a call has been setup up between two video endpoint devices, SC 241 and CCE 211 does not need to be in the data path for actual direct data exchange.

As extremely high bandwidth access networks become more accessible to residential subscribers, they enable service providers of these networks to integrate voice, video, and data, thereby providing more convenience for end customers and creating new service opportunities. Due to the multi-service nature of these new services, networks need to provide additional functionalities to end customers to support integrated control of these different types of services. For instance, a user can establish multiple application sessions to download music, to watch an on demand movie, and to make phone calls to other called parties. Each of these application sessions may have different rate structure. For example, music download may be charged on a per download basis, on demand movie may be charged on a pay per view basis, and phone calls may be charged on a flat monthly rate basis.

To address this need, the present invention enables a method for integrating billing of usage of multiple applications onto a single bill. For example, in a single day, a user may download musical selections, watch on demand video sessions, and make numerous phone calls. All the sessions can be activated over a single video endpoint device and through a single network service. Records of these sessions can be generated and aggregated to produce a single billing statement that can be accessed on a near real time basis by the user and paid automatically or at a scheduled time.

Figure 3:
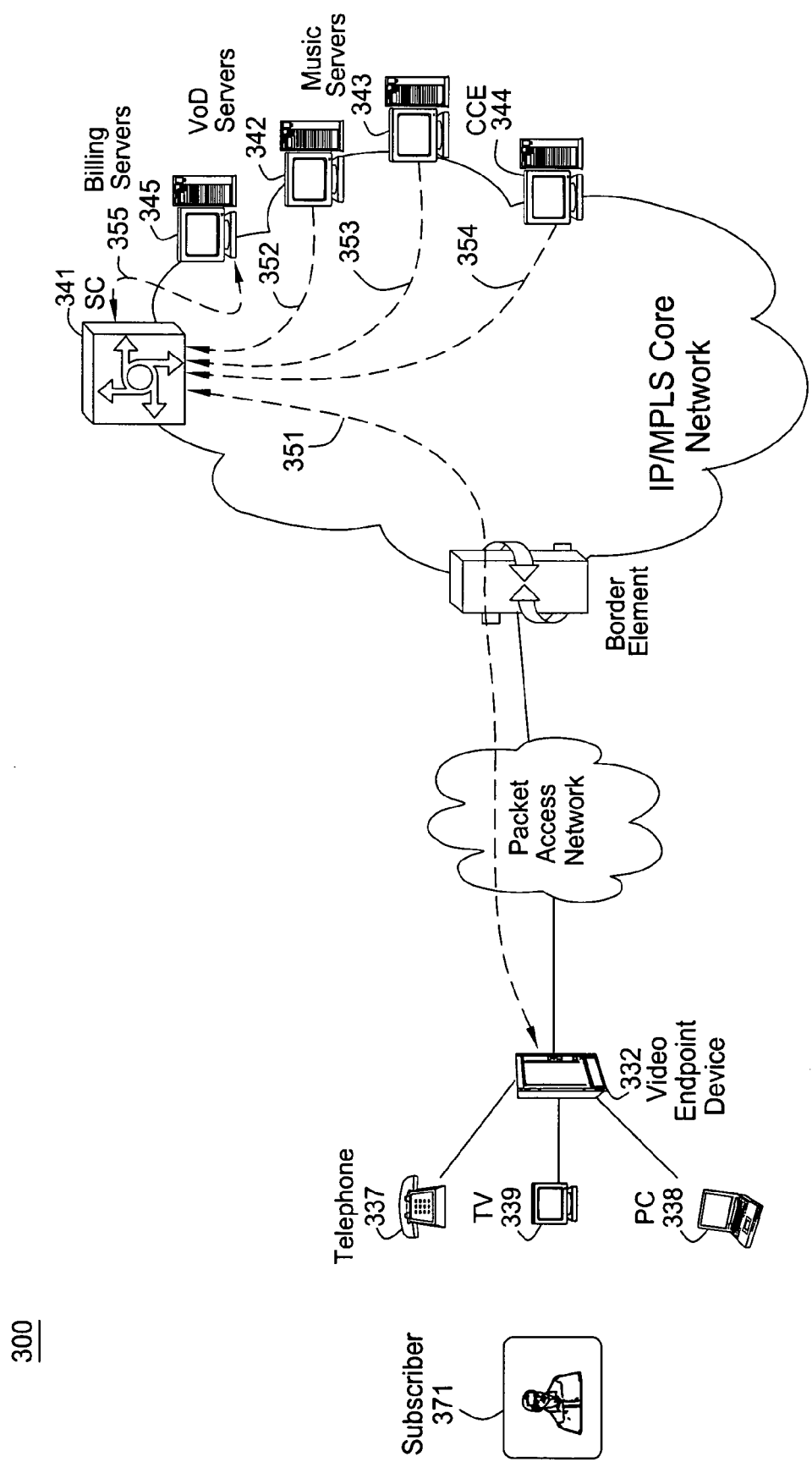
FIG. 3 illustrates an example of providing a single bill for transactions involving multiple applications in a packet network, e.g., a SoIP network, of the present invention.

FIG. 3 illustrates an example 300 of providing a single bill for transactions involving multiple applications in a packet network, e.g., a SoIP network, of the present invention. In FIG. 3, subscriber 371 uses a telephone 337 to make phone calls, personal computer (PC) 338 to download music selections, TV 339 to view pay per view movies on a regular basis, e.g., all within a single day. Whenever an application session is requested via video endpoint device 332, the request is sent by video endpoint device 332 to SC 341 using flow 351. Once the application session request is received by SC 341, SC 341 forwards it to the appropriate application servers or service supporting network elements for processing. For instance, when subscriber 371 initiates a phone call, e.g. a VoIP session, via video endpoint device 332, a call setup signaling message is sent to SC 341 to be processed. SC 341, in this case, will forward the call setup signaling message to CCE 344 using flow 354 for call processing and call setup completion.

When subscriber 371 initiates a music download session, e.g., a data session, via video endpoint device 332, a music session signaling message is sent to SC 341 to be processed. SC 341, in this case, will forward the music session setup signaling message to Music Server 343 using flow 353 for processing and session setup completion.

When subscriber 371 initiates a pay per view video session, e.g., viewing a movie, via video endpoint device 332, a video session signaling message is sent to SC 341 to be processed. SC 341, in this case, will forward the video session setup signaling message to VoD Server 342 using flow 352 for processing and session setup completion.

Note the SC 341 is the network element that tracks and records all sessions originated by all subscribers in the network. In addition, SC 341 communicates with all other application servers and service supporting network elements, such as VoD Server, Broadcast Server, CCE, Music Server, Instant Messaging Server etc, to obtain status of initiated sessions. For example, SC 341 tracks and records the termination of sessions and the duration of the sessions for billing purposes in the network. The collected session data are then forwarded to Billing Server 345 using flow 355 for billing consolidation and processing. Billing Server 345 consolidates all session billing rate structure and data on a per subscriber basis. Billing Server 345, in other words, bills each subscriber according to the rate plan (e.g., session type rate schedule) that the subscriber subscribes to for each application type. For example, pay per view movie is billed on a fixed per use basis, music download is billed on a variable per download basis depending on the cost of a particular song, and phone call is billed on a flat monthly basis. Therefore, Billing Server 345 enables a single bill for all different network services used on a per subscriber basis. In addition, Billing Server 345 updates the billing details in a near real time basis for each subscriber as new transaction is completed by the subscriber. Subscriber 371 can access Billing Server 345 via a predefined website to access the latest billing details and schedule bill payment online.

Figure 4:
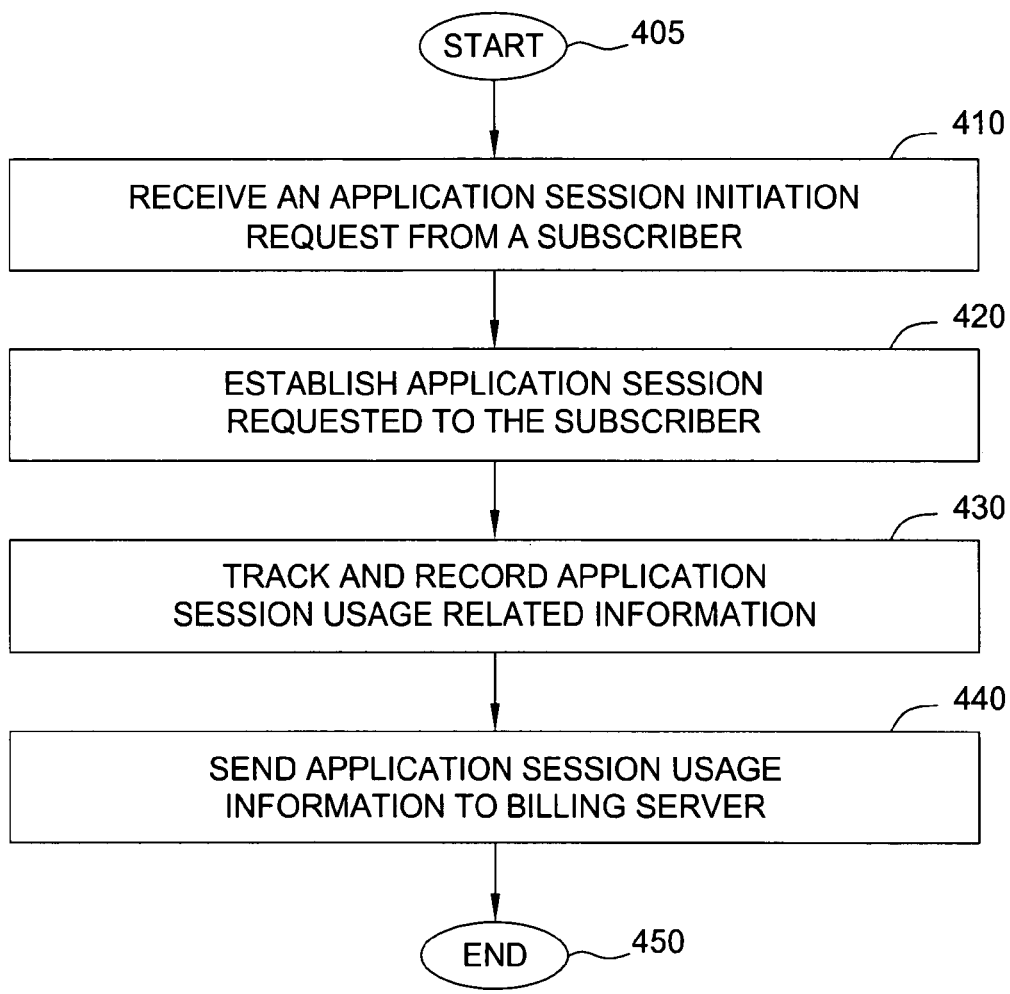
FIG. 4 illustrates a flowchart of a method for providing a single bill for transactions involving multiple applications in a packet network, e.g., a SoIP network, of the present invention.

FIG. 4 illustrates a flowchart of a method 400 for providing a single bill for transactions involving multiple applications in a packet network, e.g., a SoIP network, of the present invention. Method 400 starts in step 405 and proceeds to step 410.

In step 410, the method receives an application session initiation request from a subscriber. For example, the application session request is received by a SC.

In step 420, the method establishes the requested application session initiated by the subscriber. In particular, the SC will forward the application session request to the appropriate application server or service supporting network element to establish the requested application session to the subscriber. For instance, a video session is executed by a VoD server and a voice session is executed by a CCE.

In step 430, the method tracks and records each application session usage information (e.g., usage data) including, but not limited to, subscriber identifying information, application session type, session start time, session end time, and other relevant related session billing data. Application session usage information is forwarded from an appropriate application server or service supporting network element as well as tracked and recorded by the SC.

In step 440, once an application session is completed, the billing related session data will be sent by the SC to a Billing Server for billing processing. The Billing Server is responsible for processing, consolidating, and providing detailed billing information on a single bill on a per subscriber basis. In one embodiment, the single bill or consolidated bill is accessible online by the subscriber via a website supported or operated by a provider of the communication network. The method ends in step 450.

Figure 5:
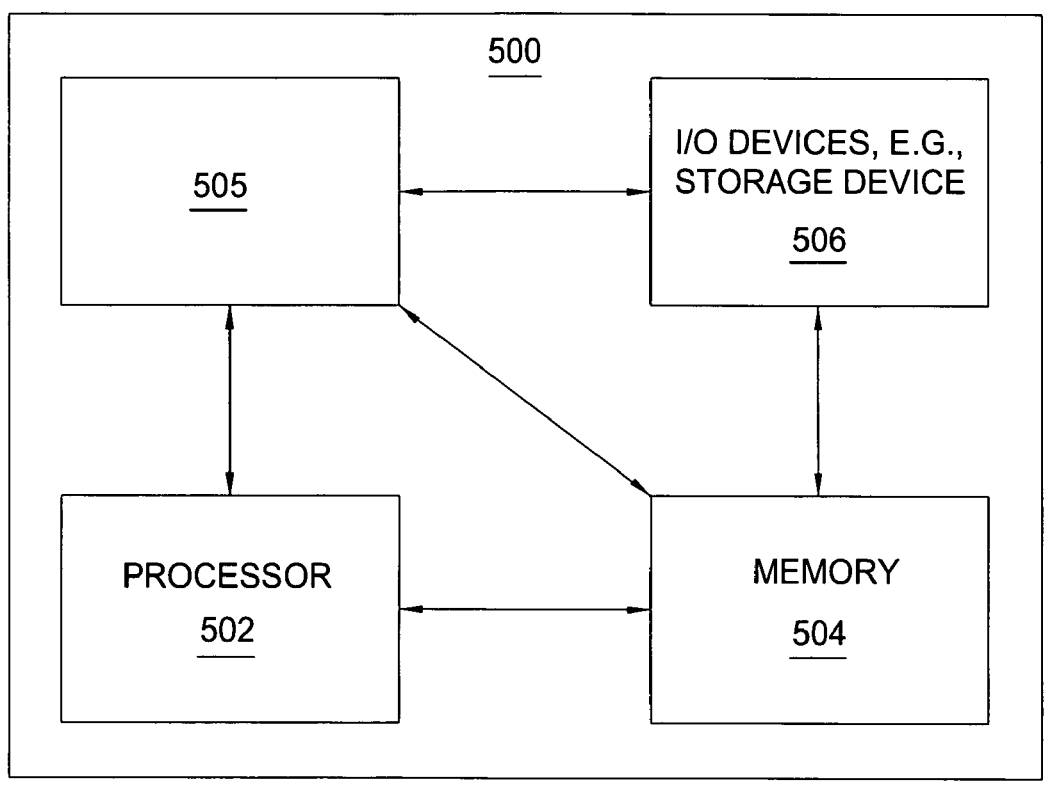
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a single bill for transactions involving multiple applications, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing a single bill for transactions involving multiple applications can be loaded into memory 504 and executed by processor 502 to implement the functions as discussed above. As such, the present process 505 for providing a single bill for transactions involving multiple applications (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a single bill for transactions involving multiple applications in a communication network, comprising:
receiving a plurality of application session initiation requests from a subscriber, where the plurality of application session initiation requests is for requesting a plurality of different types of application sessions via the communication network, wherein the different types of application sessions comprise a voice session, a video session and a data session activated over a single endpoint device, wherein each one of the different types of application sessions has a different rate plan; and
processing usage data associated with the plurality of different types of application sessions once each of the plurality of different types of application sessions is completed for generating the single bill for the subscriber, wherein the single bill is accessible online by the subscriber via a website operated by a single service provider of the communication network to provide billing details as each of the plurality of different types of applications sessions is completed.

2. The method of claim 1, wherein the communication network is a service over internet protocol network.

3. The method of claim 1, wherein the plurality of application session initiation requests is received by a session controller.

4. The method of claim 3, wherein the processing comprises:
establishing the plurality of different types of application sessions requested by the subscriber;
recording the usage data associated with the plurality of different types of application sessions; and
sending the usage data to a billing server for generating the single bill.

5. The method of claim 4, wherein the plurality of different types of application sessions is established by sending the plurality of application session initiation requests from the session controller to a plurality of corresponding application servers.

6. The method of claim 5, wherein the plurality of corresponding application servers comprise at least two of: a call control element, a video on demand server, a broadcast server, a music server, and an instant messaging server.

7. The method of claim 4, wherein the usage data is recorded by the session controller.

8. The method of claim 4, wherein the billing server applies a corresponding session type rate schedule to each of the plurality of different types of application sessions.

9. The method of claim 1, wherein the usage data comprises subscriber identification information.

10. A non-transitory computer-readable medium having stored thereon a plurality of instructions, the plurality of instructions including instructions which, when executed by a processor, cause the processor to perform a method for providing a single bill for transactions involving multiple applications in a communication network, comprising:
receiving a plurality of application session initiation requests from a subscriber, where the plurality of application session initiation requests is for requesting a plurality of different types of application sessions via the communication network, wherein the different types of application sessions comprise a voice session, a video session and a data session activated over a single endpoint device, wherein each one of the different types of application sessions has a different rate plan; and
processing usage data associated with the plurality of different types of application sessions once each of the plurality of different types of application sessions is completed for generating the single bill for the subscriber, wherein the single bill is accessible online by the subscriber via a website operated by a single service provider of the communication network to provide billing details as each of the plurality of different types of applications sessions is completed.

11. The non-transitory computer-readable medium of claim 10, wherein the communication network is a service over Internet protocol network.

12. The non-transitory computer-readable medium of claim 10, wherein the plurality of application session initiation requests is received by a session controller.

13. The non-transitory computer-readable medium of claim 12, wherein the processing comprises:
establishing the plurality of different types of application sessions requested by the subscriber;
recording the usage data associated with the plurality of different types of application sessions; and
sending the usage data to a billing server for generating the single bill.

14. The non-transitory computer-readable medium of claim 13, wherein the plurality of different types of application sessions is established by sending the plurality of application session initiation requests from the session controller to a plurality of corresponding application servers.

15. The non-transitory computer-readable medium of claim 14, wherein the plurality of corresponding application servers comprise at least two of a call control element, a video on demand server, a broadcast server, a music server, and an instant messaging server.

16. The non-transitory computer-readable medium of claim 13, wherein the usage data is recorded by the session controller.

17. The non-transitory computer-readable medium of claim 13, wherein the billing server applies a corresponding session type rate schedule to each of the plurality of different types of application sessions.

18. The non-transitory computer-readable medium of claim 10, wherein the usage data comprises subscriber identification information.

19. An apparatus for providing a single bill for transactions involving multiple applications in a communication network, comprising:

a processor configured to:

receive a plurality of application session initiation requests from a subscriber, where the plurality of application session initiation requests is for requesting a plurality of different types of application sessions via the communication network, wherein the different types of application sessions comprise a voice session, a video session and a data session activated over a single endpoint device, wherein each one of the different types of application sessions has a different rate plan; and process usage data associated with the plurality of different types of application sessions once each of the plurality of different types of application sessions is completed for generating the single bill for the subscriber, wherein the single bill is accessible online by the subscriber via a website operated by a single service provider of the communication network to provide billing details as each of the plurality of different types of applications sessions is completed.

20. The method of claim 1, wherein the usage data comprises an application session type.

\* \* \* \* \*